May 17, 1932. J. W. HINCHLEY 1,858,669
RECOVERY OF TIN FROM SCRAP TINNED PLATE AND LIKE TIN CARRYING MATERIAL
Filed Dec. 24, 1930 5 Sheets-Sheet 3
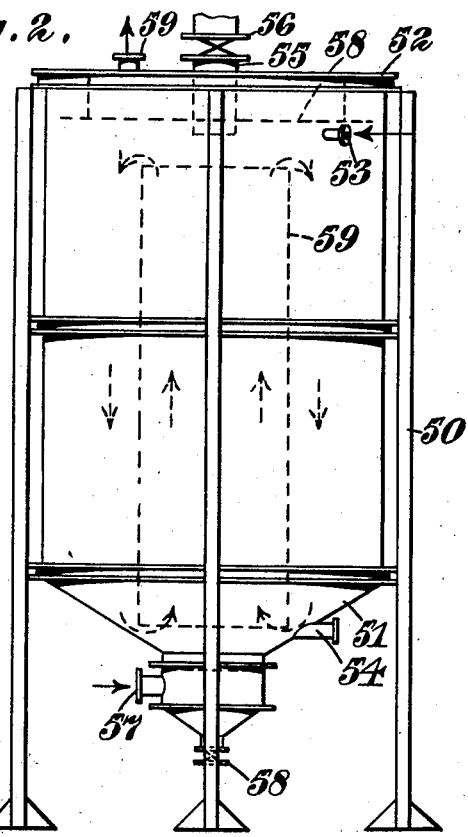
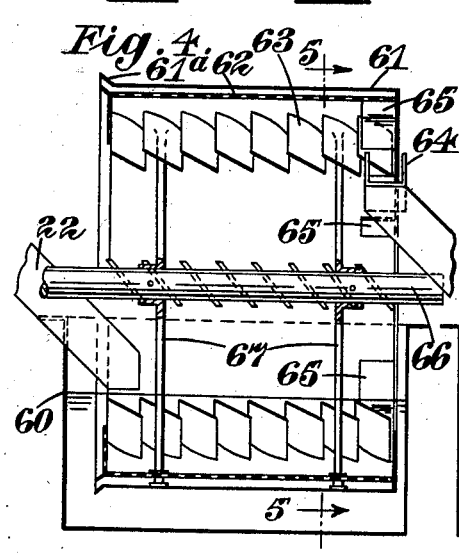
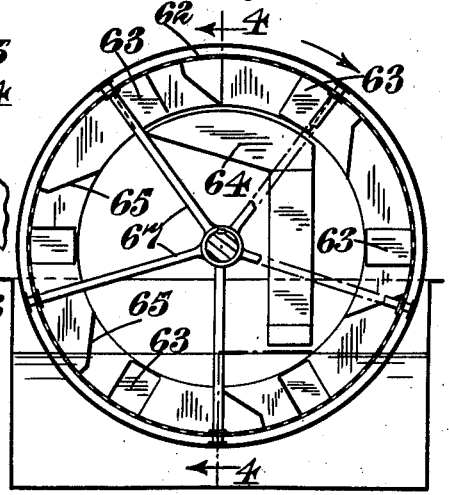
INVENTOR
John William Hinchley
by Byrnes, Stebbins, Parmelee & Blenko
his attorneys

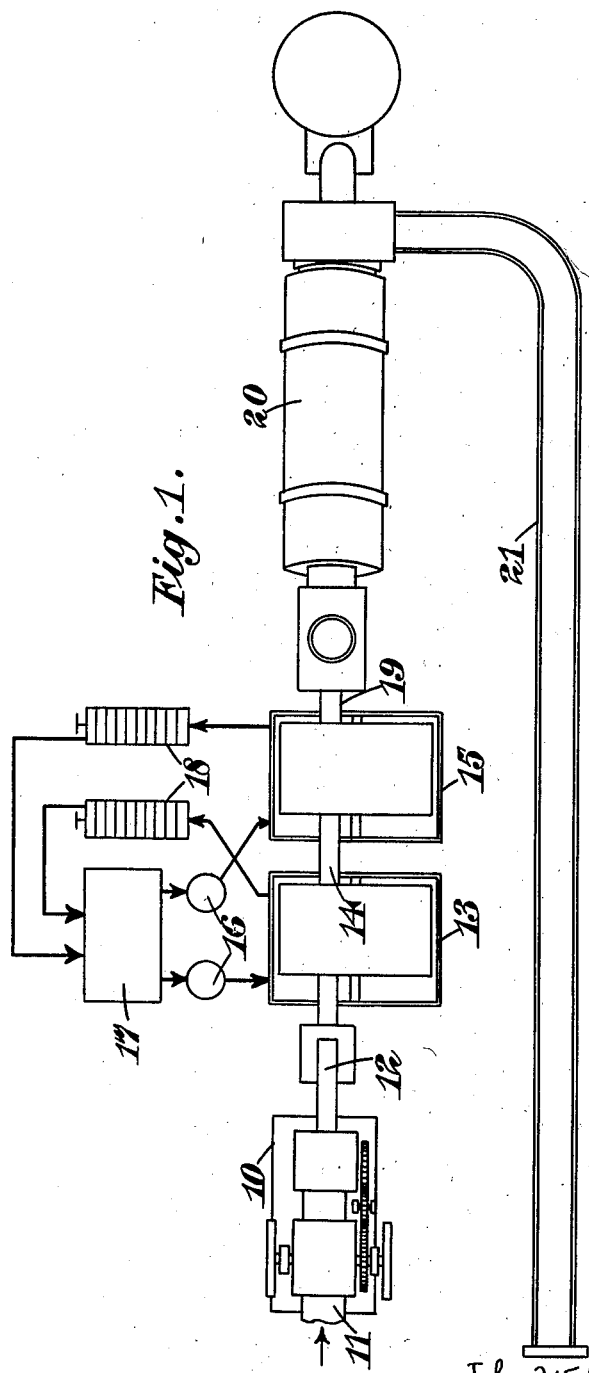

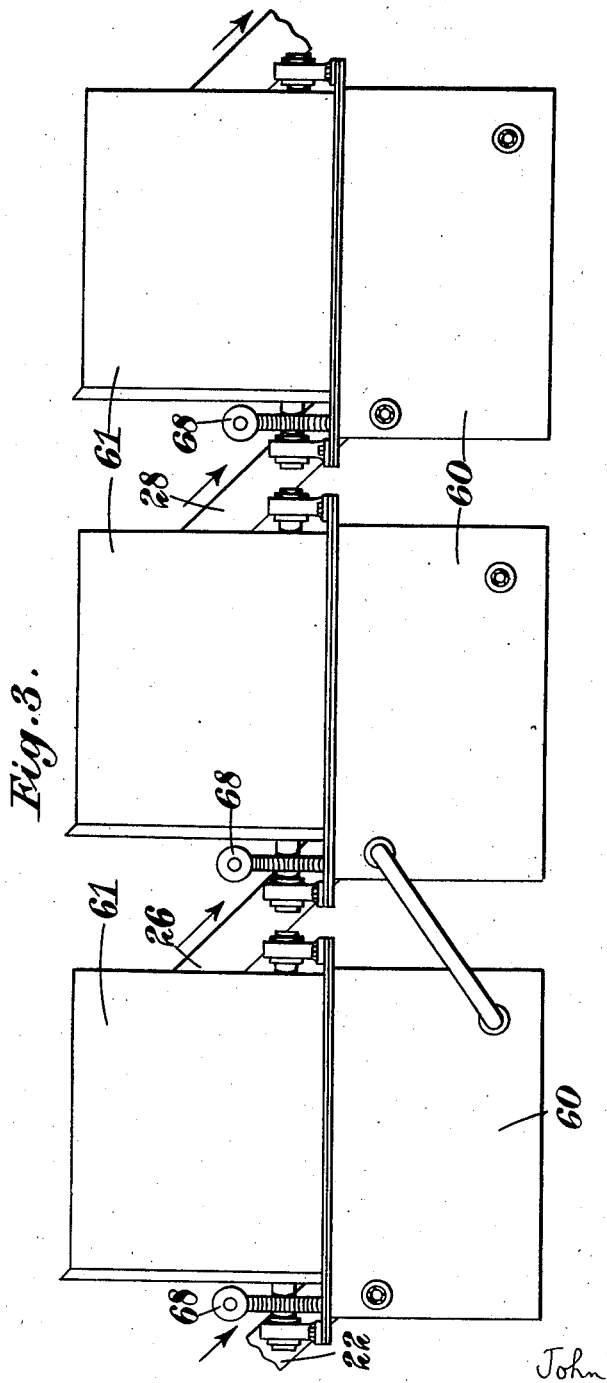

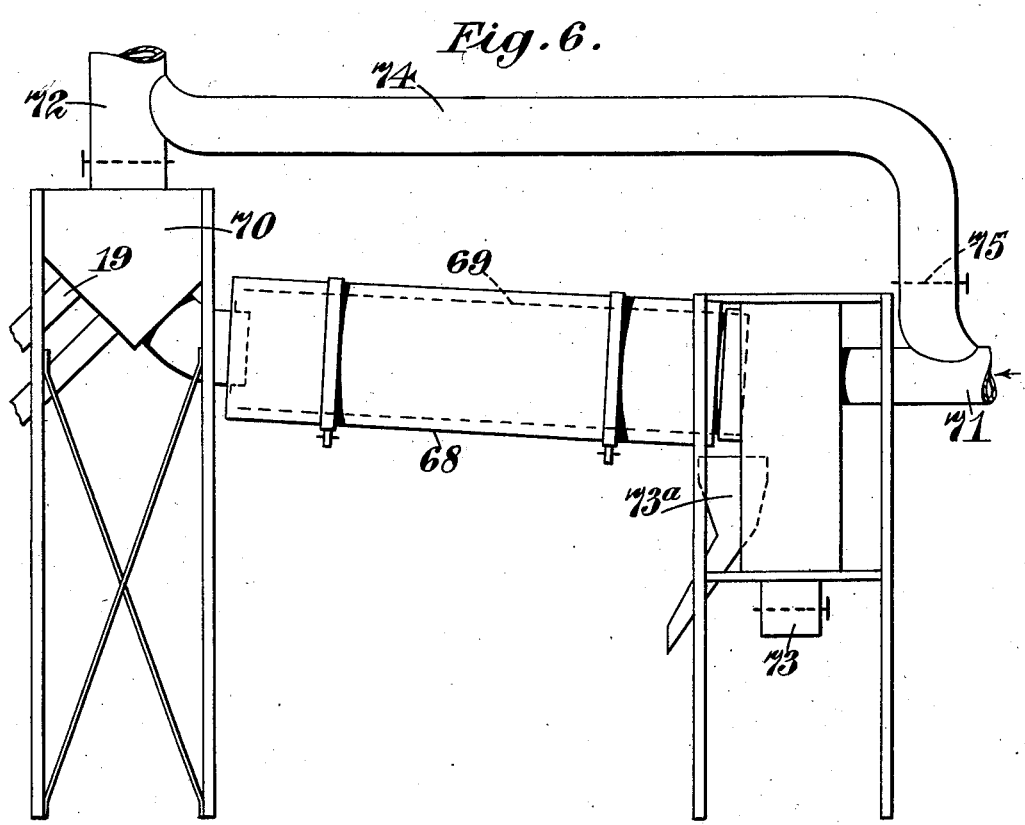

Patented May 17, 1932

1,858,669

UNITED STATES PATENT OFFICE

JOHN WILLIAM HINCHLEY, OF LONDON, ENGLAND, ASSIGNOR TO THE AFRICAN TIN RECOVERY COMPANY, LIMITED, OF PORT ELIZABETH, SOUTH AFRICA, A COMPANY OF SOUTH AFRICA

RECOVERY OF TIN FROM SCRAP TINNED PLATE AND LIKE TIN-CARRYING MATERIAL

Application filed December 24, 1930, Serial No. 504,529, and in Great Britain January 14, 1930.

This invention is for improvements in or relating to processes of recovery of tin from scrap tinned plate, and like tin-carrying material.

The type of process to which the invention relates is that in which the scrap tinned plate or the like is treated with a de-tinning solution composed of a lead compound dissolved in caustic alkali, which solution dissolves the tin from the scrap tinned plate while precipitating lead in consequence.

The invention has for its object to provide an improved process of this type, which will be more efficient and economical when operated on a commercial scale, than known processes of the type in question. More particularly, the invention has for its object to provide a cyclic regenerative process of the type referred to, which will be easy and economical to operate, having regard especially to the cost of the reagents required for the process.

According to the present invention, a de-tinning process of the type referred to is characterized by dissolving metallic lead (preferably spongy lead) in an aqueous solution of caustic alkali in excess with the aid of oxygen introduced, for example, in the form of air, into the solution and using the resulting solution in the de-tinning step.

The composition of the de-tinning solution is preferably such that the relative proportions by weight of lead, caustic alkali (reckoned as NaOH) and water, are respectively 1, 2.3, 19.

With a solution of this composition, the de-tinning step is effected at a raised temperature, for example a temperature at or near the boiling-point of the solution.

The invention further comprises a regenerative de-tinning process of the type referred to, characterized by regenerating de-tinning solution by dissolving lead precipitated in the de-tinning step in an aqueous solution of caustic alkali with the aid of oxygen introduced, preferably in the form of air, into the solution.

According to a further feature of the invention, the regenerative process referred to above may also comprise treating the tin-bearing solution which is obtained in the de-tinning step (e. g. with milk of lime) to precipitate tin therefrom and regenerate an aqueous solution of caustic alkali and using said aqueous solution in the step of regenerating the de-tinning solution.

The invention will now be further described with reference to the accompanying drawings which illustrate more or less diagrammatically a form of plant suitable for carrying out the process on a commercial scale. It is to be understood, however, that the invention is not limited in its scope either to the following detailed description or to the use of plant in accordance with the drawings.

In the drawings:

Figures 1 and 1a represent together a general lay-out of plant;

Figure 2 is an elevation of a tank for the regeneration of de-tinning solution;

Figure 3 is a view showing in elevation three tanks arranged in series and of which two are de-tinning tanks, and the third a wash tank.

Figure 4 is a vertical longitudinal section through one of the tanks shewn in Figure 3;

Figure 5 is a corresponding transverse section on the line 5—5 of Figure 4, and

Figure 6 is a view in elevation of an apparatus for removing solder and other fusible extraneous material from the surfaces of the scrap tinned plate or other tin-carrying material to be treated by the process.

Like reference characters indicate like parts in the various figures.

Figure 1A:
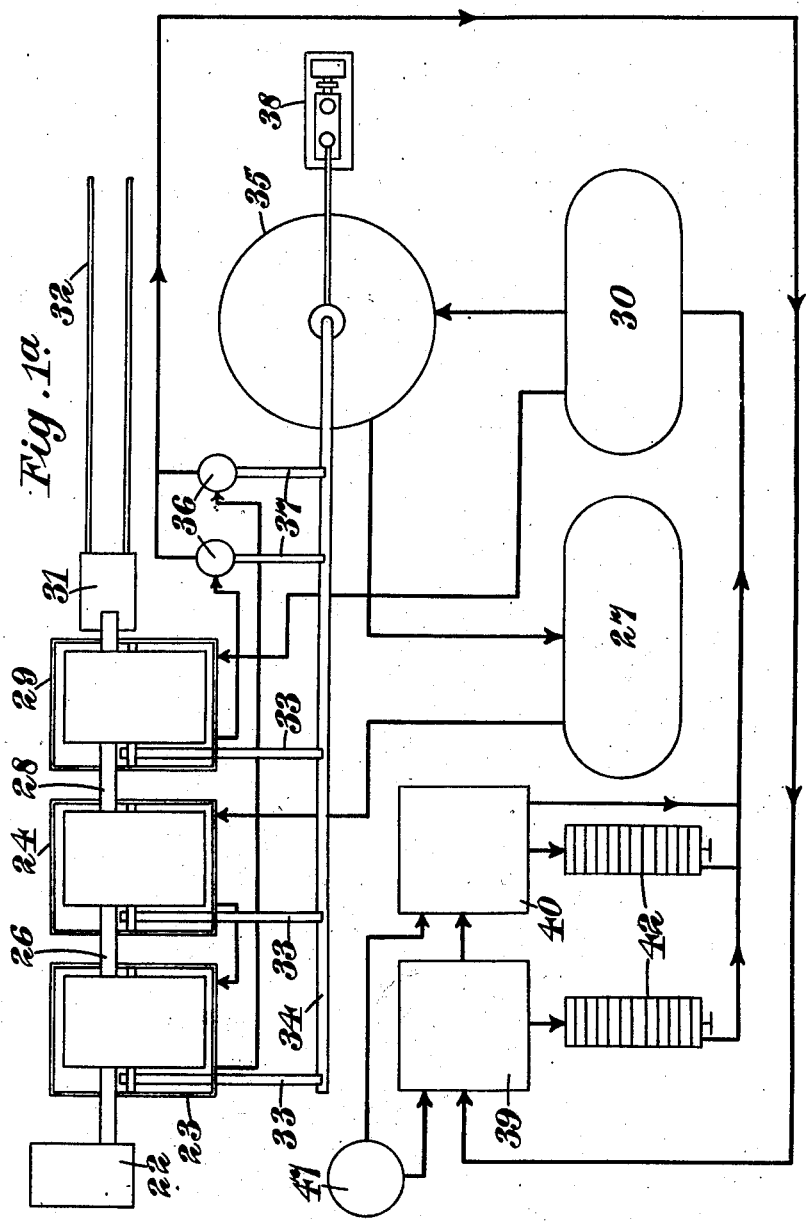

Referring first to Figures 1 and 1a, 10 is a cutting machine for sub-dividing the scrap tinned plate or other material to be treated by the process, into small strips or cuttings. The scrap tinned plate is fed to the machine 10 by means of a conveyor 11.

From the cutting machine 10 the tinned plate is fed by a conveyor 12 to a wash tank 13 and from thence by a chute 14 to a second wash tank 15. In these tanks the tinned plate is thoroughly washed or scoured with a solution of caustic alkali. This solution, which is preferably heated, is circulated by means of pumps 16 from a storage tank 17 and through filter presses 18, the filtrate from the presses being returned, as shewn, to the storage tank 17.

The scoured tinned plate is fed by a conveyor 19 to a roaster 20 (shewn in Figure 6). In this roaster the material is freed from adhering solder and the like preparatory to its being treated in the de-tinning process.

The tinned material, now ready for the de-tinning treatment, is fed, for example, in a wheeled hopper on rails 21, to a conveyor 22 which feeds it into the first of two de-tinning tanks 23, 24, respectively. In the tank 23 the tinned plate is treated with partially-spent de-tinning solution from the tank 24. It is then fed by a chute 26 from tank 23 to tank 24, wherein it is treated with fresh de-tinning solution drawn from a supply-tank therefor 27. It will be appreciated, therefore, that the de-tinned material is passed on the countercurrent principle through the two de-tinning tanks 23, 24, the de-tinning solution being passed through these tanks in the reverse direction to the transference of the material to be de-tinned.

From tank 24 the de-tinned material is fed by a chute 28 into a wash tank 29, wherein it is washed with hot caustic alkali solution taken from a supply-tank therefor 30, or with hot water. This caustic alkali solution (or hot water) removes any adhering precipitated lead from the surfaces of the de-tinned material.

The de-tinned material is discharged from wash tank 29 into a wheeled hopper 31 which conveys it away on rails 32 for disposal as required.

In the de-tinning tanks 23, 24 tin from the tinned plate passes into solution in the de-tinning liquor and metallic lead is precipitated in exchange.

This lead, which is in the form of finely divided spongy lead, is fed by conveyors 33 from tanks 23, 24, 29 to a conveyor 34, which, in turn, feeds it to a liquor regenerating tank 35 (shewn in detail in Figure 2). The spent de-tinning solution from tank 23 and the wash liquor from tank 29 are fed to centrifuges 36 which separate residual precipitated lead suspended in the liquor. This lead, separated in the centrifuges, is also fed by conveyors 37, to the conveyor 34, which feeds it, in turn, along with the main body of precipitated lead, to the liquor regenerating tank 35.

In tank 35 de-tinning solution is regenerated, and for this purpose, the precipitated lead which is fed by the conveyor 34 into the tank is treated in the tank with an aqueous solution of caustic alkali drawn from the supply-tank therefor, 30, and with air pumped into the tank by a compressor 38. The lead passes into solution in the caustic alkali possibly as lead hydrate, and the resulting solution of lead hydrate is fed from the regenerating tank to the storage tank 27, from whence, in turn, it is transferred to the de-tinning tanks, as aforesaid.

The spent de-tinning solution, after filtration by the centrifuge 36, is fed to a pair of tin-precipitating tanks 39, 40, through which it passes in series and in each of which it is treated with milk of lime from a supply-tank therefor, 41. The tin in the solution is thereby precipitated in the tanks 39, 40 as calcium stannate, and a solution of caustic soda is at the same time regenerated. The regenerated caustic soda solution is fed to the storage tank 30, and the precipitated calcium stannate is separated from residual mother liquor in filter presses 42.

The de-tinning solution is employed in the de-tinning tanks at a raised temperature, preferably about 90° C. and any convenient means for providing and maintaining this heated condition of the liquor may be employed. In this connection it may be stated that the temperature of the solution should in any event exceed about 57° C. as below this temperature the reaction ceases or becomes too feeble to enable the process to be operated economically.

The composition of the de-tinning solution is preferably such that the relative proportions by weight of water, caustic soda (reckoned as NaOH) and lead, are about 19:2.3:1, respectively; and in regenerating the de-tinning solution, the concentration of the latter is adjusted, for example, by the application of heat to evaporate water from the solution, to give a solution having the composition stated. In this connection it may be remarked that a certain small amount of precipitated lead may pass out of the system in adherence to the de-tinned scrap material, a small proportion of caustic alkali may pass out of the system also, and in addition, a certain amount of water is introduced into the closed-cycle system in the milk of lime which is added to the spent de-tinning solution to precipitate calcium-stannate therefrom. All of these factors have to be taken into account in the said adjustment of the concentration of the regenerated de-tinning solution.

A preferred method of preparing the initial body of de-tinning solution for use in the aforesaid cycle of operations is as follows. A precipitate of lead hydrate is first obtained by adding a solution of caustic alkali to a solution of a lead salt, such as for example, lead acetate, at a temperature of about 70° C. and then allowing the resulting solution to cool. The lead-hydrate precipitate, after filtration and washing, is dissolved in a further quantity of caustic alkali solution, and the proportions in this step are so adjusted as to result in a solution containing, in relative molecular weights, one part of lead to twelve parts of caustic alkali, and 185 parts of water. This solution is the initial de-tinning solution which is used in the process.

Lead-acetate is the preferred salt of lead for use in the preparation, as above, of the initial de-tinning solution, inasmuch as it is a cheap and readily obtainable commercial product and gives, moreover, a clean and uniform precipitate composed entirely of $Pb(OH)_2$.

The filtrate which is obtained from the above precipitate of lead-hydrate, may be evaporated for the recovery of the sodium salt present in it, and the recovered salt may be treated to regenerate the initial lead salt (e. g. lead acetate), which is used in the first step of the preparation of the initial de-tinning solution.

As previously stated, certain small proportions of the reagents used in the process pass out of the closed-cycle system. It becomes necessary, therefore, to add make-up quantities of de-tinning solution in order to maintain the quantity of solution passing through the system. This make-up addition of de-tinning solution is conveniently derived from a supply thereof prepared in accordance with the two-stage method of preparation described above, and as will be appreciated, the initial lead-salt (e. g. lead-acetate) which is used in this method, may, as stated, be regenerated, and used over and over again.

It will be appreciated that the process described in the foregoing is a cyclic regenerative process in which the de-tinning solution is continuously regenerated for re-use in the process and in which for the regeneration of this solution the necessary caustic alkali solution is also regenerated from the spent de-tinning solution.

It will further be observed that substantially speaking the only reagent which is continuously added into the closed cyclic system and used up in the process, other than air and water, which of course may be neglected, is milk of lime.

The air which is introduced into the tank in which the de-tinning solution is regenerated, should preferably be denuded of carbon dioxide.

Instead of precipitating the tin salt from the spent solution by means of milk of lime, the precipitation may be effected, if desired, by solid calcium hydrate or caustic lime. By this means the amount of water introduced into the closed-cycle system may be reduced as compared with the method in which milk of lime is used.

Referring now to the other figures of the drawings, the liquor-regenerating tank 35 (Figure 2) has a cylindrical wall 50, a conical bottom 51 and a closed top wall 52. Caustic alkali solution from the supply-tank 30 enters at 53 and regenerated de-tinning solution leaves the tank at 54. Precipitated lead from the tanks 23, 24, 29 enters the regenerating tank at 55, its admission to the tank being controlled by a suitable valve 56. Air from the compressor 38 enters at 57 and any undissolved lead sludge leaves by the outlet 58.

The regenerating tank 50 is maintained full of solution, and the precipitated lead entering the tank at 55 gravitates through the solution within a central tube 57 open top and bottom, against an up-current of air entering said tube at the bottom from the inlet 57. The stream of air passing up said tube 57 meets a baffle-plate 58 on emerging from the top of tube 57 becomes diverted outwardly by it and eventually leaves the tank by an outlet 59 at the top.

As will be appreciated, therefore, the finely-divided lead suspended in the solution becomes to a certain extent circulated through the body of solution in the tank, following the course of the dotted-line arrows. It is found that by this means a very rapid and complete dissolution of the precipitated lead may be effected.

The lead may be admitted to the tank 50 either continuously or intermittently, as desired.

Referring next to Figures 3, 4 and 5, the several tanks, as also the wash tanks 13, 15, are of identical construction. Each comprises a trough 60 open at the top. Rotating within this trough is a drum 61 open at both ends and accommodating within it an inner perforated drum 62 spaced from the outer drum 61, as shewn more clearly in Figure 4. The perforated drum 62 is rotatable with the outer drum 61, and within it are a series of inclined transfer vanes 63 which also are rotatable with the drum 61. These vanes operate as the drum rotates to transfer the sub-divided scrap tinned plate from the inlet end of the drum to the discharge end thereof. At the said inlet end of the drum is a supply chute 22 (26, 28, 12, 14) and at the discharge end is a stationary collecting trough 64 so positioned as to receive de-tinned material delivered into it from bucket vanes 65 built into the discharge end of the drum 61. The collecting trough 64 delivers in turn into the supply chute (22) of the next tank (24) in the series.

The drums 61, 62, together with the transfer vanes and bucket vanes, are mounted upon a rotatable shaft 66, for example, by spider arms 67, and shaft 66 is slowly rotated by a prime mover of any convenient form operating through worm-gearing 68.

The level of de-tinning or other solution in the trough 60 is maintained at such a level that the sub-divided tinned plate in the drum 62 is fully immersed in the solution as it travels along the drum to the discharge end thereof.

As de-tinning proceeds in tanks 23, 24, the lead which becomes precipitated from the solution falls through the perforations of the inner drum 62 into the outer drum, and eventually is discharged from the outer drum by way of the annular lip 61a. Similarly, extraneous matter detached from the scrap tinned material in the tanks 13, 15 and adhering lead or other matter detached from the de-tinned metal in the wash tank 29, passes through the perforated inner drums of these tanks and leaves the outer drum by the annular lip 61a at the end of the drum.

The roasting apparatus (Figure 6) comprises an outer imperforate rotating cylinder 68 having within it an inner perforated cylinder 69 which rotates with the cylinder 68. The sub-divided tinned plate to be treated in the roaster is elevated by the elevator 19 to a hopper 70, from whence it is fed into the perforated cylinder 69. It passes slowly along cylinder 69 as the latter rotates, against a current of flue gas fed into the rotating cylinders from an inlet pipe 71 leading from a furnace. Solder is melted off and any siccatives, varnish, paper, and like extraneous adhering material not removed by the previous treatment becomes burnt off the scrap metal, as it travels along the rotating cylinders, the combustion gases pass out of the apparatus by the flue, and the scrap material is discharged by the outlet 73. If desired, a by-pass conduit 74 may be provided for diverting a suitably controlled proportion of the flue gases past the roasting cylinders when desired, such by-pass being fitted with valve 75 for this purpose.

As previously indicated herein, the accompanying drawings are to be regarded as more or less diagrammatic and exemplary only and wide variation may be resorted to in the actual form of construction of plant used in carrying out the process.

I claim:—

1. A cyclic de-tinning process which comprises the steps of de-tinning solution by dissolving metallic lead in an aqueous solution of caustic alkali with the aid of oxygen introduced into the solution, treating the tin-carrying material with the solution of lead thus produced, and regenerating fresh de-tinning solution for re-use from the metallic lead precipitated in the tin-treatment step.

2. A cyclic de-tinning process which comprises the steps of dissolving spongy lead in an aqueous solution of caustic alkali with the aid of oxygen introduced into the solution, treating the tin-carrying material with the solution of lead thus produced, and regenerating fresh de-tinning solution for re-use from the metallic lead precipitated in the tin-treatment step.

3. A cyclic de-tinning process which comprises the steps of dissolving metallic lead in an aqueous solution of caustic alkali with the aid of air introduced into the solution, treating the tin-carrying material with the solution of lead thus produced, and regenerating fresh de-tinning solution for re-use from the metallic lead precipitated in the tin-treatment step.

4. A cyclic de-tinning process which comprises the steps of dissolving metallic lead in an aqueous solution of caustic alkali with the aid of oxygen introduced into the solution, the composition of the solution of lead so produced being such that it contains a substantial excess of alkali, treating the tin-carrying material with the solution of lead thus produced, and regenerating fresh de-tinning solution for re-use from the metallic lead precipitated in the tin-treatment step.

5. A cyclic de-tinning process which comprises the steps of dissolving metallic lead in an aqueous solution of caustic alkali with the aid of oxygen introduced into the solution, the composition of the resulting solution of lead being substantially such that the proportions by weight of lead, caustic alkali reckoned as NaOH and water are 1, 2.3, 19, respectively, treating the tin-carrying material with the solution of lead thus produced, and regenerating fresh de-tinning solution for re-use from the metallic lead precipitated in the tin-treatment step.

6. A cyclic de-tinning process which comprises the steps of dissolving precipitated spongy lead in an aqueous solution of caustic alkali with the aid of oxygen introduced into the solution, the composition of the solution being such that it contains a substantial excess of alkali, treating the tin-carrying material with the solution of lead thus produced at a temperature near the boiling point of the solution, and regenerating fresh de-tinning solution for re-use from the metallic lead precipitated in the tin-treatment step.

7. A regenerative de-tinning process which comprises the steps of treating tin-carrying material with a de-tinning solution composed of lead hydrate precipitated from a solution of lead acetate by means of caustic alkali, dissolved in caustic alkali, the composition of the de-tinning solution and the conditions of its use being such that lead is precipitated in the de-tinning step, and thereafter regenerating de-tinning solution by dissolving said precipitated lead in an aqueous solution of caustic alkali with the aid of oxygen introduced into the solution.

8. A regenerative de-tinning process which comprises the steps of treating tin-carrying material with a de-tinning solution composed of an oxygen compound of lead dissolved in caustic alkali, the alkali being in excess and the composition of the de-tinning solution and the conditions of its use being such that lead is precipitated in the de-tinning step, and thereafter regenerating de-tinning solution by dissolving said precipitated lead in an aqueous solution of caustic alkali with the aid of oxygen introduced into the solution.

9. A regenerative de-tinning process which comprises the steps of treating tin-carrying material in a de-tinning solution composed of an oxygen compound of lead dissolved in an excess of alkali, this de-tinning step being effected at an elevated temperature and so that metallic lead is precipitated in exchange for tin which passes into solution, and thereafter regenerating de-tinning solution by dissolving said precipitated lead in an aqueous solution of caustic alkali with the aid of oxygen introduced into the solution.

10. A regenerative de-tinning process which comprises the steps of treating tin-carrying material with a de-tinning solution composed of an oxygen compound of lead dissolved in an excess of caustic alkali, the composition of the de-tinning solution and the conditions of its use being such that lead is precipitated in the de-tinning step and tin passes into solution in exchange, treating the resulting tin bearing solution to precipitate tin therefrom and regenerate an aqueous solution of caustic alkali, and regenerating de-tinning solution by dissolving said precipitated lead in the regenerated caustic alkali solution with the aid of oxygen introduced into the solution.

In testimony whereof I affix my signature.

JOHN WILLIAM HINCHLEY.